(No Model.)

P. GENDRON.
CAR WHEEL.

No. 322,276. Patented July 14, 1885.

Attest:
A. Barthel
N. Payne

Inventor:
Peter Gendron
by his Att'y Thos. S. Sprague

UNITED STATES PATENT OFFICE.

PETER GENDRON, OF TOLEDO, OHIO.

CAR-WHEEL.

SPECIFICATION forming part of Letters Patent No. 322,276, dated July 14, 1885.

Application filed November 26, 1884. (No model.)

*To all whom it may concern:*

Be it known that I, PETER GENDRON, of Toledo, in the county of Lucas and State of Ohio, have invented new and useful Improvements in Car-Wheels; and I do hereby declare that the following is a full, clear, and exact description thereof, reference being had to the accompanying drawings, which form a part of this specification.

This invention relates to certain new and useful improvements in the manufacture of car-wheels, by means of which the sound is deadened to the occupant of the car running upon the wheels, and at the same time a certain elasticity is obtained.

The invention consists in the construction, combination, and operation of the various parts, as more fully hereinafter described.

Figure 1:
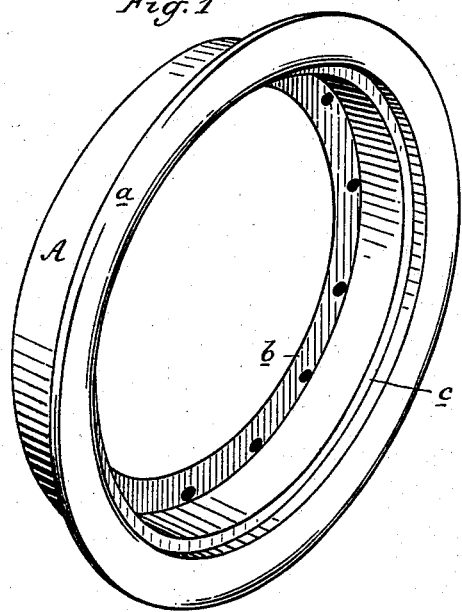
Figure 2:
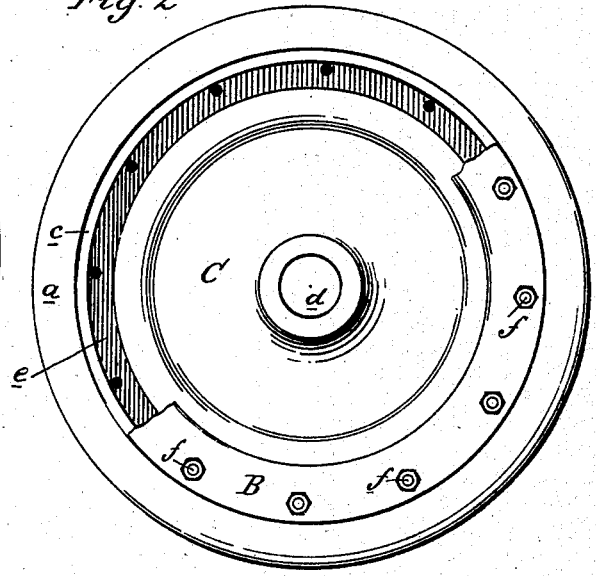
Figure 3:
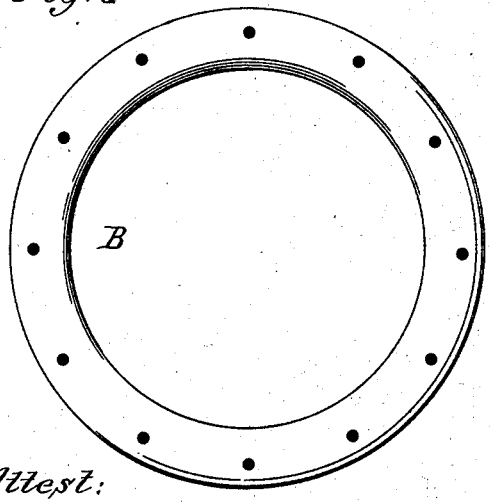
Figure 4:
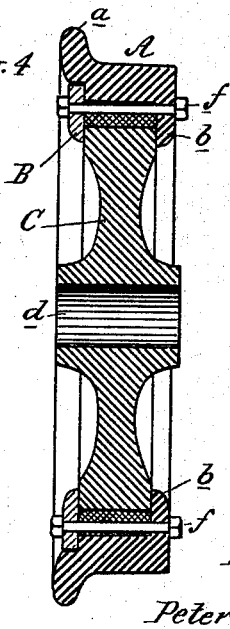

Figure 1 is a detached perspective view of the tread. Fig. 2 shows the inner wheel within the tread and the annular space between the two parts. Fig. 3 is a plan view of the confining-ring detached. Fig. 4 is a central section of a completed wheel made in accordance with my improvement.

In the accompanying drawings, which form a part of this specification, A represents the tread or tire of the wheel, having the usual f ange, *a*, to keep it upon the track. It also has upon its rear face, or the face opposite that from which the flange *a* is formed, an inwardly-projecting flange, *b*. This tread is preferably made of steel, and is so rolled and made that the flange *b*, which is made of malleable iron, forms an integral part of the tread or tire, which latter is formed with an annular offset or shoulder, *c*, adapted to re- c ive the retaining-ring B.

C is a wheel having a hub, *d*, adapted to engage with the axle, and be secured thereto in any of the ordinary or known ways. This wheel has a flat periphery and is smaller than the inner periphery of the tire, sufficiently to form an annular space, *e*, between the two when the parts are in place, and this annular space is filled with any suitable material having the necessary properties of being a non-conductor of sound and having the requisite amount of elasticity. There are various kinds of this material—such as india-rubber, gutta-percha, paper in various forms, and others which will suggest themselves to practical men—but whatever material is employed for the purpose must be put in under sufficient pressure to be firm in its place. After the inner portions of the wheel are in place, the confining-ring B is inserted in the tread or tire, resting upon the shoulder *c*, so that the outer face of such confining-ring is flush with the corresponding face of the wheel. Then suitable bolts, *f*, are employed to hold the parts rigidly together. These bolts pass through the confining-ring and the flange *b* immediately in rear of the inner periphery of the tire, passing through the edge of the filling in the annular space, so as to leave as much of the filling between the bolts and face of the inner wheel as is possible.

The tire may be made of wrought-iron, with the flange *b*, if preferred, and a steel tire shrunk thereon, if preferred, without departing from the spirit of my invention, although I prefer to make it as I have described.

By this construction a steel tire may be employed which can readily be tempered without danger of breaking in the operation.

I am aware of the Patent No. 104,053, and make no claim to anything shown therein as forming part of my invention.

I deem it important that the retaining-ring be made independent of the inner wheel, instead of integral therewith, as has been the custom; for by this construction there are two breaks in the connection between the center and the tire, thus lessening the noise, which is an important feature, especially when used on elevated roads. Another advantage of this independent ring is that it may be easily made of wrought metal, whereby a much stronger ring is provided than one which is cast, as it must necessarily be when made integral with the inner wheel, and in case of the ring breaking it can be readily replaced, still using the old center, whereas when the ring is formed integral with the center, if the ring breaks a whole new center must be substituted.

I am also aware of the Patent No. 126,085, and make no claim to the construction shown therein as forming part of my invention.

What I claim as my invention is—

A car-wheel consisting of the tire A, having outwardly-projecting flange $a$ and inwardly-projecting flange $b$ formed integral therewith, and provided with annular offset $c$, the inner wheel, C, having a flat periphery, an elastic filling between said tire and inner wheel, the independent confining-ring B, inserted in said tire and resting on said offset $c$, and the bolts $f$, passing through said ring, filling, and flange $b$, and securing the parts rigidly together, substantially as and for the purposes specified.

PETER GENDRON.

Witnesses:
H. S. SPRAGUE,
CHARLES J. HUNT.